United States Patent Office 2,865,893
Patented Dec. 23, 1958

2,865,893

HYDROLYSIS COPOLYMERS OF VINYL ACETATE AND UNSATURATED CARBAMATES

Cornelius C. Unruh and Donald A. Smith, Rochester, N. Y., assignors to Eastman Kodak Company, Rochester, N. Y., a corporation of New Jersey No Drawing. Application July 27, 1954
Serial No. 446,168

7 Claims. (Cl. 260—77.5)

This invention relates to modified polymers having the characteristics of polyvinyl alcohol but being capable of being hardened by formaldehyde more readily than unmodified polyvinyl alcohol.

Polyvinyl alcohol has been known for many years as a material capable of forming films and fibers of excellent mechanical and chemical characteristics. The primary disadvantage of polyvinyl alcohol for many uses is the fact that it is readily water soluble and hence cannot be used in applications wherein a degree of water insolubility is necessary. Thus, for example, attempts have been made to employ polyvinyl alcohol as a photographic emulsion vehicle. The water-soluble characteristics of the polymer made it a desirable material for use in preparing the emulsions and in casting films. It was necessary, however, to have some means of hardening the films to prevent them from redissolving during processing.

One of the most widely used methods for hardening polyvinyl alcohol involves the use of formaldehyde, which cross-links the polymers and thereby causes insolubilization. In most cases, the conditions necessary to achieve the requisite hardening of polyvinyl alcohol by formaldehyde were too stringent to be acceptable for use in photographic applications. Thus, it was necessary to employ a low pH and a large amount of formaldehyde. Attempts were made to employ other cross-linking agents, such as melamine, alone or in conjunction with formaldehyde, but such attempts did not achieve any great success since the hardening process adversely affected the properties of the emulsion. Polyvinyl alcohol, in unmodified form, is cross-linked only through the hydroxyl groups, and, in the presence of water, the cross-linking reaction is not efficient whereby unduly drastic conditions must be employed to effect insolubilization to the requisite degree.

It is accordingly an object of this invention to provide new and improved modified polymers which possess the advantageous properties of polyvinyl alcohol, but which can be more readily hardened with formaldehyde than is polyvinyl alcohol, whereby products of increased utility in the photographic arts are obtained.

Another object of the invention is to prepare modified copolymers which, in their final form, consist predominantly of combined vinyl alcohol groups in a copolymeric structure including urethane groups sufficient to facilitate cross-linking and insolubilization of the polymer without adversely affecting the desirable properties imparted by the vinyl alcohol groups.

Another object of the invention is to provide new and improved polymeric materials which are of particular utility in photographic applications, and particularly for use as photographic emulsion vehicles.

Another object of the invention is to provide modified polymers which are normally water soluble, and which can be cast into clear films, but which, unlike unmodified polyvinyl alcohol, can be readily hardened with formaldehyde under photographically acceptable conditions.

Other objects will be apparent from the description and claims which follow.

Since vinyl alcohol does not exist in monomeric form, polyvinyl alcohol is ordinarily produced in an indirect manner, usually by hydrolysis of a polyvinyl ester polymer. The preparation of polyvinyl alcohol from polyvinyl ester is well known in the art, and a number of method variations have been proposed for effecting the deacetylation or hydrolysis of the polyvinyl ester polymer. One of the early methods was that of Herrmann et al., U. S. 1,672,156, wherein vinyl esters were hydrolyzed to polyvinyl alcohol by means of aqueous alkali. An improved method for preparing polyvinyl alcohol was disclosed in Noller, U. S. 1,896,856, wherein the hydrolysis was effected with alcoholic alkali and water. The acid hydrolysis of a polyvinyl ester to polyvinyl alcohol in alcoholic media was disclosed in Stamatoff, U. S. 2,478,431. Other methods of preparing polyvinyl alcohol by the hydrolysis of vinyl esters were disclosed in Herrmann et al., U. S. 2,109,883; Berg, U. S. 2,227,-997; Germain, U. S. 2,502,715; and Kenyon et al., U. S. 2,642,420. A continuous process for manufacturing polyvinyl alcohol on a commercial scale was disclosed in Waugh et al., U. S. 2,642,419. In these various methods of preparing polyvinyl alcohol, the hydrolyzable polyvinyl ester which is used can be hydrolyzed to any desired degree from about 10% hydrolysis up to substantially 100% hydrolysis.

In accordance with this invention, water-soluble polymeric materials having the desirable properties of polyvinyl alcohol but which can be hardened with formaldehyde more readily than polyvinyl alcohol, are prepared by copolymerizing a vinyl ester of a carboxylic acid, which normally forms a polymer which is hydrolyzable to polyvinyl alcohol, with an allylic urethane, and hydrolyzing the resulting water-insoluble copolymer to a water-soluble polymer. The presence of the combined allylic urethane units in the polymer, interspersed with the vinyl alcohol units, greatly enhances the ability of the polymer to cross-link with formaldehyde under relatively mild conditions. We have found that in the copolymers of a vinyl ester and an allylic urethane, the hydrolysis can be effected in any of the usual ways employed for preparing polyvinyl alcohol from a polyvinyl ester, without adversely affecting the urethane groups which are included in the copolymeric structure. Thus the vinyl ester portions of the polymer molecule are converted to vinyl alcohol units in exactly the same way as occurs in an unmodified polyvinyl ester.

Attempts have been made to modify polyvinyl alcohol by the incorporation of nitrogen-containing groups into the molecule, but this was usually done by reacting the polyvinyl alcohol itself with an amine or similar nitrogen-containing material which would react with the hydroxyl groups of the polyvinyl alcohol. This, of course, modified the properties of the polymer since it no longer included unmodified vinyl alcohol units. We have found, however, that the allylic urethanes, such as allyl and methallyl carbamate, readily copolymerize with the vinyl esters ordinarily employed for preparing polyvinyl alcohol without necessitating the use of unusual or difficult polymerization conditions. Thus, the vinyl ester, which is preferably vinyl acetate for convenience, but which can be any vinyl ester which can be hydrolyzed in polymeric form to give polyvinyl alcohol units, readily copolymerizes with allyl or methallyl carbamate. The copolymerization is desirably carried out using about 80–99% by weight of vinyl ester and about 1–20% by weight of the allylic urethane. In this range of proportions, the copolymerization proceeds readily, and the resulting water-insoluble copolymer can be hydrolyzed by and of the well known hydrolysis processes to form a water-soluble polymer which can be readily hardened with formaldehyde. The resulting hydrolysis products can be employed for casting films from either aqueous organic solutions. The films which are thus formed have excellent optical clarity and are entirely suited for use as photographic emulsion vehicles. These films, which originally are readily water soluble, can then be hardened and the polymers rendered insoluble by treatment with formaldehyde. The polymers embodying the invention can be prepared either batchwise or by continuous processes in accordance with usual techniques, and the polymeric products are suitable for use in either black-and-white or color film. The polymers are particularly useful as photographic emulsion vehicles containing photosensitive materials, such as silver halides, but they can also be used for other applications both within and outside the photographic field.

The hydrolysis of the initial water-insoluble copolymer can be carried out to any desired degree which renders the polymer water soluble. The degree of hydrolysis will depend to a certain extent upon the ease of water solubility desired, the proportion of vinyl ester to allylic urethane in the polymer, and similar variable factors. Usually it is desirable to hydrolyze the copolymer in order to deacetylate from 50 to 100% of the ester groups, although lower degrees of hydrolysis may be suitable in some cases, as, for example, hydrolysis of as little as 10% or more desirably from about 20 to about 50%.

The invention is illustrated by the following examples of certain preferred embodiments thereof. It will be understood, however, that the examples are merely illustrative of the invention and are not intended to limit the scope of the invention unless otherwise specifically indicated.

Example 1

A solution of 43 g. of vinyl acetate, 0.58 g. of methallyl carbamate and 0.50 g. of benzoyl peroxide in 50 ml. of methanol was maintained at 50° C. for four days. The resulting viscous dope of water-insoluble copolymer dissolved in methanol was diluted to about 500 ml. with methanol and poured into a large volume of water. The product which precipitated was then redissolved in methanol and reprecipitated in water. This product contained 0.36% combined nitrogen. The polymer was then deacetylyzed or hydrolyzed by dissolving it in 75 ml. of methanol and treating the resulting solution with 8 g. of 10% sodium hydroxide in methanol. The resulting gel was ground and extracted with methanol. The nitrogen content of this hydrolyzed product was 0.3%. The hydrolyzed copolymer was readily water soluble and was cast into clear films which were suitable for use as photographic emulsion vehicles. The resulting films were readily hardened, and the polymer rendered insoluble by treatment with aqueous formaldehyde. Allyl carbamate gives similar results when employed in place of the methallyl carbamate.

Example 2

A solution containing 86.0 g. of vinyl acetate, 5.0 g. of methallyl carbamate, 0.20 g. of benzoyl peroxide, and 25 ml. of methanol was maintained at 60° C. for 65 hours. The resulting viscous dope was diluted with 200 ml. of methanol and treated with 25 ml. of 10% sodium hydroxide in methanol. The gel was washed with methanol, dissolved in warm water, and the product isolated by precipitation in methanol. The nitrogen content of this polymer was 1.0%. As in the case of the polymers prepared in the preceding example, this polymer was readily water soluble and formed clear films which hardened with formaldehyde much more readily than polyvinyl alcohol films.

Example 3

A copolymer of 43 g. of vinyl acetate with 2.88 g. of methallyl carbamate was prepared by copolymerization in the presence of 0.5 g. of benzoyl peroxide. The resulting polymer was hydrolyzed with alcoholic base to give a water-soluble polymer containing 0.6% by weight of combined nitrogen.

Example 4

The process of Example 2 was employed for copolymerizing 43 g. of vinyl acetate and 5.75 g. of methallyl carbamate in the presence of 0.5 g. of benzoyl peroxide. The resulting copolymer was rendered water soluble by hydrolysis with methanolic sodium hydroxide to give a product having a combined nitrogen content of 1.7%.

Example 5

Similar results were obtained by copolymerizing 86 g. of vinyl acetate with 10 g. of methallyl carbamate in the presence of 0.2 g. of benzoyl peroxide. The resulting copolymer, after hydrolysis, contained 2.0% of combined nitrogen, was readily water soluble, and was readily insolubilized with formaldehyde.

Example 6

By the process of Example 2 a copolymer of 43 g. of vinyl acetate and 8.62 g. of methallyl carbamate was prepared in the presence of 0.4 g. of benzoyl peroxide. The resulting copolymer, after hydrolysis in the usual manner, had a combined nitrogen content of 2.9% and was suitable for use as a photographic emulsion vehicle.

Similar results are obtained employing allyl carbamate in the same manner as the methallyl carbamate with vinyl acetate or any other vinyl ester of a carboxylic acid which normally forms a copolymer which can be hydrolyzed to polyvinyl alcohol.

The copolymerization is effected in accordance with usual polymerization practices such as are well known in the art. The polymerization is desirably effected in solution in an organic solvent such as an alcohol, since the copolymer precipitates from aqueous emulsion as it is formed. Best results are obtained when the hydrolysis is effected by means of alcoholic alkali, although any of the methods normally employed for deacetylating polyvinyl acetate to polyvinyl alcohol can be used. If desired, the initial water-insoluble copolymer can be separated from the polymerization mixture prior to hydrolysis, although this is not necessary and the hydrolysis can be effected directly in the polymerization medium in which the copolymer was formed.

As in the usual copolymerization, the polymerization of this invention is facilitated by the use of elevated temperatures and polymerization catalysts. Ordinarily, temperatures of from 35° C. to 120° C. are suitable with temperatures of from 50 to 90° C. being preferred. Any of the well known polymerization catalysts including any of the per-catalysts such as peroxides, percarbonates, persulfates, and the like can be used to promote the copolymerization. Such catalysts are well known in the art, and it is not intended that the invention shall be limited to any particular polymerization conditions. The amount of catalyst can also be varied, although amounts of from about 0.01 to 2.0% are usually employed. The hydrolyzed copolymers of the invention desirably contain about 0.1 to 5% of combined nitrogen.

Although the invention has been described in detail with particular reference to certain preferred embodiments thereof, variations and modifications can be effected within the spirit and scope of the invention as described hereinabove and as defined in the appended claims.

We claim:

1. The method of making a water-soluble polymer capable of being readily hardened by formaldehyde which comprises copolymerizing about 80–99% by weight of vinyl acetate with about 1-20% by weight of an allylic urethane from the group consisting of allyl and methallyl carbamates, and hydrolyzing the resulting water-insoluble copolymer with a solution of an alkali metal hydroxide in alcohol to a water-soluble polymer having a nitrogen content of 0.3-2.9%.

2. The method of making a water-soluble polymer capable of being readily hardened by formaldehyde which comprises copolymerizing about 80-99% by weight of vinyl acetate with about 1-20% by weight of methallyl carbamate, and hydrolyzing the resulting water-insoluble copolymer to water-soluble form containing 0.3-2.9% combined nitrogen with methanolic sodium hydroxide.

3. The method of making a water-soluble polymer capable of being readily hardened by formaldehyde which comprises copolymerizing about 80-99% by weight of vinyl acetate with about 1-20% by weight of allyl carbamate, and hydrolyzing the resulting water-insoluble copolymer to water-soluble form containing 0.3-2.9% combined nitrogen with methanolic sodium hydroxide.

4. A water-soluble polymer containing 0.3-2.9% combined nitrogen and resulting from hydrolysis, with a solution in alcohol of an alkali metal hydroxide, of a copolymer of about 80-99% by weight of vinyl acetate and about 1-20% by weight of methallyl carbamate.

5. A water-soluble polymer containing 0.3-2.9% combined nitrogen and resulting from hydrolysis, with a solution in alcohol of an alkali metal hydroxide, of a copolymer of about 80-99% by weight of vinyl acetate and about 1-20% by weight of allyl carbamate.

6. A water-soluble hydrolyzed copolymer of vinyl acetate and an allylic urethane from the group consisting of allyl and methallyl carbamates, said hydrolyzed copolymer having a nitrogen content of about 0.3-2.9% and resulting from treating the copolymer with a solution in alcohol of an alkali metal hydroxide.

7. A cast film of hydrolyzed copolymer of vinyl acetate and an allylic urethane from the group consisting of allyl and methallyl carbamates, said hydrolyzed copolymer containing about 0.3-2.9% by weight of combined nitrogen and resulting from treatment of the copolymer with a solution of sodium hydroxide in methanol.

References Cited in the file of this patent

UNITED STATES PATENTS

| 2,388,851 | Kenyon et al. | Nov. 15, 1945 |
| 2,483,194 | Gleim | Sept. 27, 1949 |